United States Patent
Dementhon (10) Patent No.: US 10,315,161 B2
(45) Date of Patent: Jun. 11, 2019

(54) GAUGING THE AUTONOMY OF A SYSTEM FOR STORING AND DELIVERING GASEOUS AMMONIA

(71) Applicant: AAQIUS & AAQIUS SA, Geneva (CH)

(72) Inventor: Jean-Baptiste Dementhon, Paris (FR)

(73) Assignee: AAQIUS & AAQIUS SA, Geneva (CH)

( * ) Notice: Subject to any disclaimer, the term of this patent is extended or adjusted under 35 U.S.C. 154(b) by 410 days.

(21) Appl. No.: 14/420,656

(22) PCT Filed: Aug. 9, 2013

(86) PCT No.: PCT/EP2013/066759
§ 371 (c)(1),
(2) Date: Feb. 9, 2015

(87) PCT Pub. No.: WO2014/023836
PCT Pub. Date: Feb. 13, 2014

(65) Prior Publication Data
US 2015/0231568 A1    Aug. 20, 2015

(30) Foreign Application Priority Data

Aug. 9, 2012 (EP) ..................................... 12305990

(51) Int. Cl.
*G01M 15/00* (2006.01)
*B01D 53/94* (2006.01)
*F01N 3/20* (2006.01)

(52) U.S. Cl.
CPC ..... *B01D 53/9495* (2013.01); *B01D 53/9409* (2013.01); *F01N 3/2066* (2013.01);
(Continued)

(58) Field of Classification Search
CPC ............ B01D 53/9495; B01D 53/9409; F01N 3/2066
(Continued)

(56) References Cited

U.S. PATENT DOCUMENTS 8,473,226 B2 * 6/2013 Quaade ................... C01C 1/006
702/55
8,834,603 B2 * 9/2014 Johannessen ........... C01C 1/006
95/15

FOREIGN PATENT DOCUMENTS

DE    102008001004    10/2009
EP    1688599 A1    8/2006
(Continued)

OTHER PUBLICATIONS

JP Office Action with English translation dated Mar. 7, 2017, JP Application No. 2015-525905.
(Continued)

*Primary Examiner* — Jason D Shanske
(74) *Attorney, Agent, or Firm* — Womble Bond Dickinson (US) LLP (57) ABSTRACT

Method for gauging the autonomy of a system for storing and delivering gaseous ammonia to a consumer unit (3), the system comprising: a gaseous-ammonia storage cell (8) comprising a dedicated heating means (9), and at least one sensor (61, 64) of at least one parameter of the system, the method comprising steps consisting in: controlling the system on the basis of an intrusive reference datum independent of an ammonia demand from the consumer unit (3), during the control step, taking an intrusive measurement of at least one parameter of the system using the sensor (61, 64), and comparing the intrusive measurement against a threshold value of at least one parameter under the control conditions in order to estimate the autonomy of the system with respect to a filling threshold of the cell (8) that corresponds to the threshold value of the parameter.

21 Claims, 4 Drawing Sheets

(52) U.S. Cl.
CPC ...... *F01N 2610/02* (2013.01); *F01N 2610/06* (2013.01); *F01N 2610/10* (2013.01); *F01N 2900/1808* (2013.01); *F01N 2900/1814* (2013.01); *Y02T 10/24* (2013.01); *Y10T 137/0318* (2015.04); *Y10T 137/6416* (2015.04)

(58) Field of Classification Search
USPC ...................................................... 73/114.73
See application file for complete search history.

(56) References Cited

FOREIGN PATENT DOCUMENTS

| | | | |
|---|---|---|---|
| EP | 1 977 817 A1 | 10/2008 | |
| EP | 1 992 397 A1 | 11/2008 | |
| EP | 2 412 946 A1 | 2/2012 | |
| EP | 2 428 490 A1 | 3/2012 | |
| EP | 2 444 614 A1 | 4/2012 | |
| JP | 2005147118 A * | 6/2005 | ........... F01N 3/2066 |
| JP | 2008163919 A | 7/2008 | |
| JP | 2012047156 A * | 3/2012 | |
| WO | WO 2011/103968 A2 | 9/2011 | |
| WO | WO 2011103968 A2 * | 9/2011 | ............. G01C 1/006 |
| WO | WO-2012034706 | 3/2012 | |

OTHER PUBLICATIONS

Office Action in Chinese Application No. 201380047255.7 dated Jul. 6, 2017, with English translation.

\* cited by examiner

GAUGING THE AUTONOMY OF A SYSTEM FOR STORING AND DELIVERING GASEOUS AMMONIA

FIELD OF THE INVENTION

The invention generally relates to the storing of ammonia in applications for reducing nitrogen oxides $NO_x$ by selective catalytic reduction (SCR), in particular for reducing the emissions of pollutants by diesel engines.

STATE OF THE ART

The emissions of pollutants linked to transport have been for nearly thirty years a leading engine for progress in industry. The progressive increase in the severity of the limits of emissions for the four regulated pollutants (CO, HC, $NO_x$, particles) has made it possible to significantly improve the quality of the air in particular in large built-up areas.

The constantly increasing use of the automobile requires that efforts to further reduce these emissions of pollutants be continued. A decrease in the tolerance with regards to European emissions thresholds is expected in 2014 in the framework of the steps for the coming into effect of the Euro6 standard. Such measures aim to reduce the local pollution. Having available highly effective depollution technologies in all conditions of circulation is as such a major stake for the transport industry. In this context, the reducing of nitrogen oxides ($NO_x$) as lean-burn, i.e. as a mixture containing an excessive amount of oxygen, represents a major stake associated with a complex problem.

Moreover, fuel consumption, directly linked with $CO_2$ emissions, was propelled in just a few years to the level of major concern for the automobile. As such, regulations were put into place on a European level starting in 2012 on the $CO_2$ emissions of private vehicles. It is already acquired that this limit will be lowered on a regular basis in the upcoming decades. Reducing $CO_2$ emissions has therefore imposed itself as the new engine for growth for the entire transport industry.

This double problem of reducing local pollution ($NO_x$) and reducing fuel consumption ($CO_2$) is particularly difficult for the Diesel engine of which the combustion as lean-burn is accompanied with $NO_x$ emissions that are difficult to treat.

In this context, the SCR ("selective catalytic reduction") post-treatment technology is used for private vehicles as well as for vehicles for transporting merchandise. It is then possible to position the engine on its optimal operation for efficiency, with the high emissions of $NO_x$ then being treated in the exhaust by the SCR system allowing for an $NO_x$ reduction with high efficiency.

In order to set up such an SCR technology it is necessary to embark on board the vehicle a reducing agent required for reducing nitrogen oxides. The system currently retained by heavy good vehicles uses urea in an aqueous solution as a reducing agent. Injected into the exhaust, the urea is broken down by the effect of the temperature of the exhaust gases into ammonia ($NH_3$) and allows for the reduction of the $NO_x$ on a specific catalytic converter. An aqueous solution of urea retained and standardised for the operation of the current systems in series of SCR is referenced in AUS32 (with the commercial name in Europe being Adblue®).

This highly effective method suffers however from a certain number of disadvantages. It has a cold performance that is limited, although such a situation occurs in several cases, in particular that of buses in town. The urea reservoir has a substantial mass and volume, typically 15 to 30 L for a private vehicle, 40 to 80 L for a heavy goods vehicle. Such an encumbrance results in a complexity of integration into the vehicle that is increasingly substantial as the vehicle is small. This results in a high cost for pollution removal, as well as an excessive mass which is to the detriment of the fuel consumption of the vehicle and therefore the emissions of $CO_2$.

Various alternative methods of storage have been considered. The option of storing ammonia in gaseous form under pressure has many disadvantages in terms of compactness and operating safety.

A privileged method consists in an absorption of the gas inside a material, for example a salt, arranged in a storage chamber. The storage of ammonia is then carried out in the salt by the forming of a chemical complex of the ammoniacate type. The advantages of this type of storage with respect to urea in aqueous solution are many. The storage within a salt allows for a significant reduction in the mass and volume of the storage reservoir. It also allows for a benefit in terms of the $CO_2$ footprint due to the decrease in the mass of the reducer to be embarked for a given autonomy in ammonia. Indeed, the additional quantity of water provided in order to dilute the urea in the conventional configuration of the SCR, referred to as liquid, is saved. Moreover, this type of storage makes it possible to implement a cold absorption of $NO_x$ with a higher efficiency. This type of storage furthermore provides a reduction in the manufacturing costs as the system for supplying and injecting the ammonia can be simplified.

In practice, the ammonia is injected continuously into the exhaust in stoichiometric proportions of the $NO_x$ reduction reaction. It is therefore suitable to be able to store onboard a sufficient quantity of ammonia. In order to limit the encumbrance of the storage chamber, automobile manufactures favour a filling or a replacing of the storage chamber, for example during engine maintenance, at the time of emptying, or during a filling of the fuel tank. According to the vehicles considered (private vehicles, heavy good vehicles, etc.) it is required to provide between 10 and 100 filling or replacing operations during the service life of the vehicle.

This operation of periodical maintenance, required in order to provide for effective pollution removal of the $NO_x$ during the entire life of the vehicle, is subject to specific regulations in the various countries where the SCR technology is used. A common point of all of these regulations is the necessity to be able to determine the quantity of reducer remaining in the storage chamber in order to be able to warn the driver when a filling has to be carried out. For example, in the European legislation for private vehicles, it is necessary to be able to measure two thresholds of remaining autonomy, respectively at 2400 km and 800 km, which correspond respectively to about three full tanks and one full tank of fuel.

A gauging is therefore required in the case of systems for storing and delivering gaseous ammonia. In addition to the regulatory requirement, the gauging of the stored ammonia is required for the management of the system in the case where several storage chambers are integrated into the vehicle. Indeed, in order to simplify the integration into the vehicle, or in order to improve the operation of the storage system (introduction of a cold start unit), the storage is in most cases distributed into several storage chambers. The management between these various storage chambers requires knowing the remaining quantity of gaseous ammonia.

A possible solution is to carry out a gauging by adding up the controls for ammonia applied to the system for storing and delivering or flow measurements of gaseous ammonia exiting the system.

However, these measurements lack precision. In particular, for this type of gauging, the imprecision of each adequacy between the control or the measurement and the quantity actually injected are added to one another.

Moreover, the relativity of these measurements involves possibilities of deluding the system so that the latter considers for example that a chamber has just been filled again.

SUMMARY OF THE INVENTION

A purpose of the invention is to provide a gauging that does not have these disadvantages.

To this effect, a method for gauging the autonomy of a system for storing and delivering gaseous ammonia to a consumer unit is provided, with the system including:
- a gaseous-ammonia storage cell including a dedicated heating means, and
- at least one sensor of at least one parameter of the system, the method including the steps consisting in:
- controlling the system on the basis of an intrusive reference datum independent of an ammonia demand from the consumer unit,
- during the controlling step, carrying out an intrusive measurement of at least one parameter of the system by the sensor, and
- comparing the intrusive measurement with a threshold value of at least one parameter under the control conditions in order to estimate the autonomy of the system in relation to a filling threshold of the cell that corresponds to the threshold value of the parameter.

The invention is advantageously supplemented by the following characteristics, taken individually or in any of their technically permissible combinations:
- the system includes a means for regulating the flow of gaseous ammonia to the consumer unit, with the setting including a flow and heating setting,
- the step of intrusive control includes a first sub-step consisting in controlling the system according to a zero flow rate and constant pressure setting of the cell,
- the step of intrusive control includes a second sub-step consisting in controlling the system via a maximum flow rate setting,
- the at least one parameter measured by the intrusive measurement includes a pressure or a temperature of the cell,
- the at least one parameter measured by the intrusive measurement includes a heating power of the cell,
- the method further includes the steps consisting in:
  evaluating at least one characteristic value, and
  according to the at least one characteristic value evaluated:
    defining a frequency for launching the steps of intrusive control and of intrusive measurement, or
    triggering steps of intrusive control and of intrusive measurement,
- the method further includes the steps consisting in:
  estimating a quantity of gaseous ammonia delivered by the cell,
  calculating a load rate of the cell with ammonia by integrating estimates of the quantities of gaseous ammonia delivered, with the load rate being a characteristic value,
- the method further includes a step consisting in reinitialising the value of the load rate of the cell with ammonia after the replacing of a storage cell with a storage cell saturated with gaseous ammonia,
- the system includes a flow sensor, with the estimate of the quantity of gaseous ammonia delivered being carried out via the measurement of the flow of gaseous ammonia by the flow sensor,
- the estimate of the quantity of gaseous ammonia delivered is carried out by integrating a command for delivering gaseous ammonia of the system,
- the characteristic value includes at least:
  an average pressure in gaseous ammonia of the system over a given period,
  an average heating power supplied to at least one cell over a given period,
  a time after a starting of the consumer unit,
  a characteristic length of the operation of the consumer unit over a given period,
- the method includes a step consisting in filtering and/or averaging the intrusive measurement before the step of comparing,
- the method includes a step consisting in calibrating the threshold value of the intrusive measurement according to the characteristics of the storage cell,
- the method includes a step consisting in degrading an operating mode of the consumer unit and/or of the system for storing following the estimation of a crossing of the filling threshold in order to decrease the ammonia demand.

The invention also relates to a system for storing and delivering gaseous ammonia to a consumer unit, with the system including:
- a gaseous-ammonia storage cell including a dedicated heating means,
- a means for regulating the flow of gaseous ammonia to the consumer unit,
- a control device including:
  means for controlling the dedicated heating means and means for regulating the flow of gaseous ammonia, and
  at least one sensor of at least one parameter of the system, with the system being suited to implement such a method.

BRIEF DESCRIPTION OF THE FIGURES

Other characteristics, purposes and advantages of the invention shall appear in the description hereinafter of an embodiment. In the annexed drawings.

DETAILED DESCRIPTION OF THE INVENTION

Figure 1:
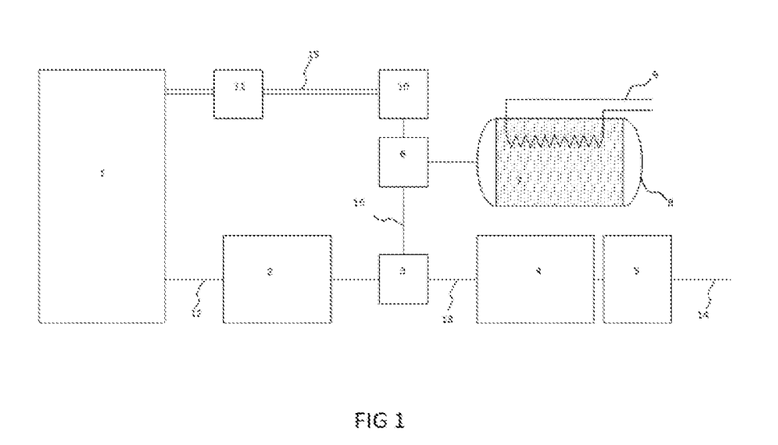
FIG. 1 diagrammatically shows a heat engine provided with a SCR post-treatment system FIG. 2 diagrammatically shows a system for storing and supplying ammonia according to an example embodiment of the invention, FIG. 3 diagrammatically shows a method for gauging the autonomy of a storage system according to an example embodiment of the invention.

1) Examples Showing an Embodiment of the System a. Example Showing an Embodiment of the SCR Post-Treatment System FIG. 1 diagrammatically shows a heat engine provided with an SCR post-treatment system via the injection of ammonia.

An engine 1 is controlled by an electronic computer 11. At the output of the engine, exhaust gases 12 are directed to a pollution control system 2. The pollution control system 2 can include an oxidation catalytic converter or a three-way catalytic converter. The pollution removal system can furthermore include a particle filter.

Ammonia 16 is injected on an exhaust circuit 100 of the engine and mixed with the exhaust gases by means of an injection module 3 arranged for example downstream of the pollution removal element 2 in order to form an ammonia/exhaust gas mixture 13. The injection module 3 as such constitutes a consumer unit. The ammonia/exhaust gas mixture 13 then passes through a SCR catalytic converter 4 which allows for the reducing of $NO_x$ via the ammonia. Additional post-treatment elements 5 can be positioned after the SCR catalytic converter. The additional elements 5 can include a particle filter or an oxidation catalytic converter. The exhaust gases are thus in the form of cleaned exhaust gases 14 at the output of the additional elements 5. The cleaned exhaust gases are then directed to an exhaust outlet 17. As such the exhaust 100 includes, arranged upstream, on the engine side 1, downstream, on the output side 17, the pollution removal element 2, the injection module 3, the SCR catalytic converter 4, and the additional elements 5.

In order to provide for a supply and a dosage of ammonia 16 at the inlet of the injection module 3, the system includes a chamber or cell for storing and supplying with ammonia 8 including a storage chamber of ammonia containing a storage structure 7 that can be controlled in temperature by a heating device 9 or reheating device. The heating device 9 includes for example an electrical resistance or a heat exchanger supplied by a heat transfer fluid such as engine coolant.

The storage structure 7 includes a powdery salt. The principle of storing ammonia in salts, in particular of the alkaline earth metal chloride type by reversible chemisorption is known to those skilled in the art and is not included here.

The heating device 9 can include several heating modules (not shown).

The storage cell 8 is connected to a device 6 for controlling the pressure of the chamber and for the dosage of the ammonia to the injection module 3. This pressure control device 6 can be controlled by a dedicated electronic controller or control device 10 connected to the electronic computer 11 of the engine.

The system as such includes a system for storing and supplying ammonia 200 including, from upstream to downstream in the direction of the circulation of the ammonia, the storage cell 8, the pressure control device 6, and the injection module 3 in the exhaust 100.

In an alternative configuration not shown, the pressure control device 6 can be directly controlled by the engine computer 11.

b. Example Illustrating an Embodiment of a System for Storing and Supplying

Figure 2:
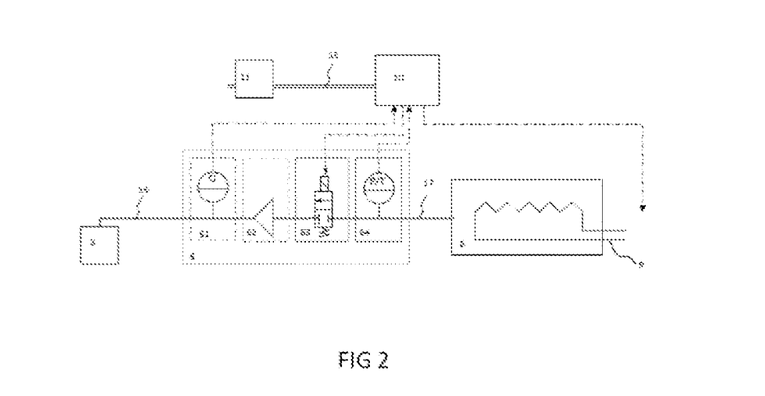

In reference to FIG. 2, a system for storing and supplying ammonia is described of which the pressure control device 6 allows for the controlling in pressure of the chamber and the dosage of the flow of ammonia to the exhaust.

The storage cell 8 can be made of metal, for example a steel alloy, or of plastic, for example a composite plastic. The storage cell 8 can be of various geometries known to those skilled in the art. The storage chamber 8 is for example with a rotational symmetry.

The heating device 9, or reheating device is for example of the electrical resistance type. The heating device 9 can alternatively include a heat exchanger of the solid/liquid type, for example by using water or engine lubricant, or of the solid/gas, for example by using exhaust gases. The heating device 9 can be placed around the storage chamber 8 or at the core of the storage cell 8, within the storage material of the storage structure 7.

The system includes at least one sensor of at least one parameter of the system. The sensor or sensors can be included in the pressure control device 6 for controlling the pressure of the chamber and the dosing of the control ammonia in pressure. As such, the pressure control device 6 can include a gas sensor or pressure sensor 64. The pressure sensor 64 is for example a pressure sensor or a temperature sensor that makes it possible to determine through calculation a pressure of the ammonia gas.

The pressure control device 6 can include a means for regulating the flow such as a module for dosing gas 63. The module for dosing gas 63 is for example of the solenoid valve type.

The pressure control device 6 can further include a flow sensor or gas flow meter 61 allowing for the measurement of an ammonia flow. The flow meter 61 is for example arranged downstream of the module for dosing gas 63 in the direction of flow of the gas to the consumer unit 3.

The pressure control device 6 can also include a module 62 that makes it possible to reduce the pressure oscillations at the output of the device for dosing. The module for reducing oscillations 62 is for example of the sonic neck type.

The heating device 9 makes it possible to release the ammonia stored in the storage cell 8 by raising the temperature of the storage material of the storage structure 7. The liberation of the ammonia causes an increase in the pressure within the storage cell 8.

The control device 10 can include means for regulating the pressure measured by means of the pressure sensor 64, via a suitable controlling of the heating device 9 of the storage structure 7. When a pressure 17 that is sufficiently high and sufficiently stable is generated, the control device, possibly looped on the flow sensor 61, makes it possible to control the injection of ammonia to the exhaust according to the flow requested.

The flow and the pressure of ammonia are two key performance items of the system. Regardless of the load rate in ammonia of the material of the storage structure 7, in normal operation, the system must be able to provide a maximum flow rate that is sufficiently high, for example of about 50 to 200 mg/s of ammonia, for efficient $NO_x$ pollution removal over a wide operating range of the vehicle. The system for storing must be able to provide a sufficiently high pressure, for example of about 2 to 5 bars, in order to allow for an injection and an efficient mixture of the ammonia with the exhaust gases on the consumer unit 3.

The storage material of the storage structure 7 must have good thermal conductivity in order to limit the energy to be provided in order to increase the temperature and pressure of all of the material regardless of the load rate in ammonia of the material. Moreover, then material must have a permeability for the gas that is high in order to provide for a sufficient flow rate of ammonia regardless of the load rate of the material. In a privileged implementation of the material, a binder of the expanded natural graphite type can be added to the metal chloride salt.

Figure 7:
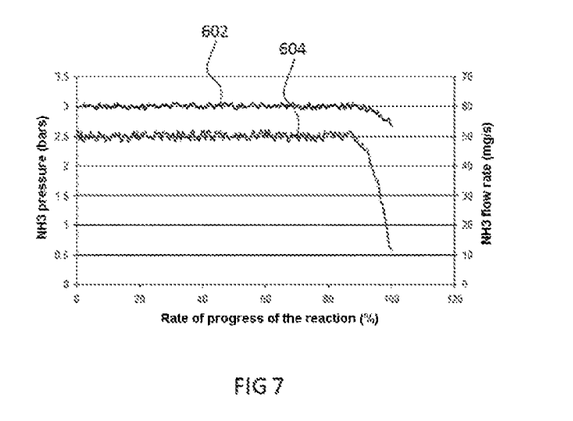
FIG. 7 shows a change of the pressure and flow of ammonia during a desorption by imposing a constant heating power.

However, regardless of the quality of the implementation, when the storage material of the storage structure 7 is emptied of the ammonia, there is a progressive decrease in the maximum flow rate and pressure until depletion of the stored ammonia. FIG. 7 shows the change in pressure, via the pressure curve 602, and of the flow rate, by the flow rate curve 604, of ammonia during a desorption by imposing a constant heating power.

When the rate of progress of the reaction approaches 100%, i.e. the cell has been emptied of its ammonia, a drop is observed in the maximum flow rate that the system can provide. Typically, this drop occurs starting at a rate of progress of 80 to 90%.

2) Example Showing an Embodiment of the Method a. Intrusive Control and Intrusive Measurement In reference to FIG. 3, a method for gauging the autonomy of the system for storing and delivering gaseous ammonia to the consumer unit 3 is described.

Figure 3:
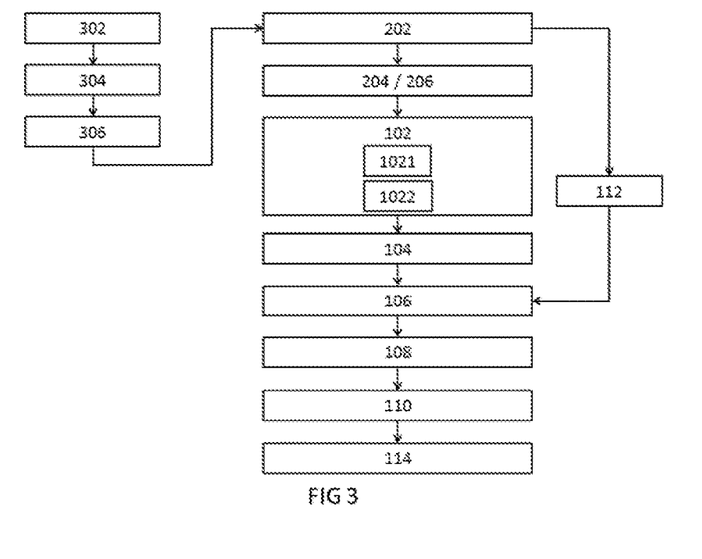

The method includes a first step 102 consisting in controlling the system for storing according to an independent intrusive setting of an ammonia demand from the consumer unit 3. The controlling is for example carried out by the control device 10.

The system can include a means for regulating the flow 63 of gaseous ammonia to the consumer unit 3, with the setting then including a flow rate and heating setting.

As such the step of intrusive controlling 102 can include a first sub-step 1021 consisting in controlling the system according to a zero flow rate and constant pressure setting of the cell 8. The pressure setting is for example close to the system setting, for example of about 2 to 5 bars.

The step of controlling can include a second sub-step 1022 consisting in controlling the system via a maximum flow rate setting. This second sub-step 1022 can be carried out when the conditions of the system defined by the setting of the first sub-step 1021 are stable. The flow rate setting can correspond to the maximum flow rate of design, for example of about 50 to 200 mg/s. In the case where the remaining autonomy is high, i.e. that the progress of the reaction is less than 80%, the pressure can be maintained at its pressure setting while still providing a flow rate that corresponds to the maximum flow rate. In the case where the remaining autonomy approaches zero, the pressure cannot be maintained with an opening of the device for dosing corresponding to the maximum flow rate, even by increasing the heating power. The pressure falls, all the more so when the autonomy is close to zero.

The method further includes a second step 104 consisting, during the step of controlling, in carrying out an intrusive measurement of at least one parameter of the system by the at least one sensor, for example the flow meter 61 or the pressure sensor 64, over a given period. The at least one parameter measured by the intrusive measurement can include a pressure or a temperature of the cell 8. It is as such possible to evaluate the pressure and/or the maximum flow rate of the ammonia that the cell can provide. The at least one parameter measured by the intrusive measurement can include a heating power of the cell.

The step of intrusive measurement 104 is for example interrupted after a duration that can be calibrated. Several values, for example two, can be retained in memory and transmitted to a decision-making module of the control device 10. This can for example be the measurement of the pressure and of the heating power at the end of the intrusive measurement 104.

Figure 4:
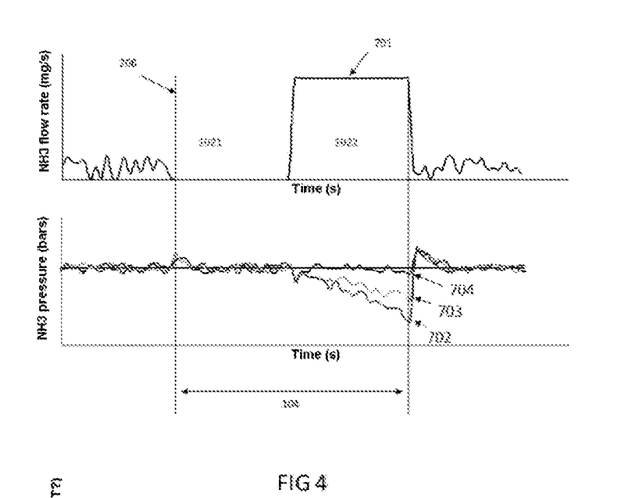
FIG. 4 shows the behaviour of a physical variable measured during a step of intrusive measurement of an example method of gauging according to an embodiment of the invention.

In reference to FIG. 4, an example of the operating principle of the method for gauging is described. The curve 701 shows the change in the flow rate setting of the system. The curve 702, respectively 703 and 704, shows the internal pressure of a cell that has a filling rate of 5%, respectively 10% and greater than 20%.

The intrusive controlling 102 and the intrusive measurement 104 consist as such in controlling the system in conditions that allow for an evaluation of the quantity of stored ammonia. The intrusive measurement therefore interrupts the normal operation of the system by affecting on a one-off basis the efficiency of the $NO_x$ pollution removal.

The method includes a third step 106 consisting in comparing the intrusive measurement with a threshold value of at least one parameter under the control conditions. Indeed, at the end of the intrusive measurement step 104 the values measured are transmitted.

The comparison then makes it possible to carry out a fourth step 108 consisting in precisely estimating the autonomy of the storage system with respect to a filling threshold of the storage cell 8 that corresponds to the threshold value of the parameter.

It is as such possible to evaluate at any time the ammonia available in the system and to warn the control device 10, for example when certain critical thresholds of autonomy are reached.

The method can furthermore include a step consisting in filtering 110 and/or averaging the intrusive measurement before the step of comparing 106. It is as such possible to remove the incoherent or out-of-scope values of the measurement, for example the values obtained during an engine stoppage during the intrusive measurement 104.

This information can be made use of to alert the driver. The method can also include a step 114 consisting in degrading an operating mode of the consumer unit and/or of the system for storing and/or switching over to another storage cell following the estimation 108 of a crossing of the filling threshold in order to decrease the ammonia demand.

The method can further include a step consisting in calibrating 112 the threshold value of the intrusive measurement according to the characteristics of the storage cell 8 evaluated.

Figure 5:
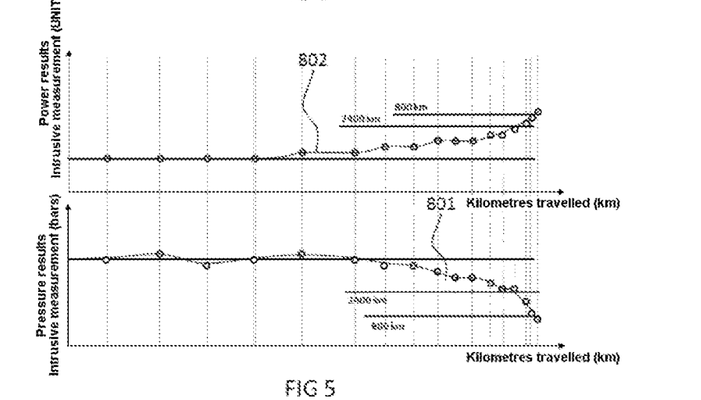
FIG. 5 shows a step of comparing the intrusive measurement to a threshold of a method for gauging according to an embodiment of the invention.

In reference to FIG. 5, the pressure and heating power values measured during the intrusive measurement 104 are filtered before being used to define two sliding averages for pressure 801 and heating power 802.

For the storage cell 8 considered, pressure and power stages are defined by calibration corresponding to the critical thresholds for which it is necessary to trigger a specific action. This is for example, an alert for the driver at 2400 km and 800 km of autonomy.

According to the cases, a single "intrusive pressure measurement" or "intrusive power measurement" parameter or both can be used to decide on the crossing of a critical threshold. In the case where both parameters are used, a logic decision including an AND or OR gate can be implemented.

b. Calculating the Load Rate

The method can include a step 302 consisting in estimating a quantity of gaseous ammonia delivered by the cell 8.

The system 8 can include a flow sensor, with the estimating 302 of the quantity of gaseous ammonia delivered then able to be carried out by measuring the flow of gaseous ammonia to the consumer unit 3 by the flow sensor 61. During the step 304 the flow rate measurements are integrated and the result is subtracted from the initial autonomy.

Alternatively, the estimating 302 of the quantity of gaseous ammonia delivered can be carried out by integration of a command for delivering gaseous ammonia of the system coming from the control device 10.

This step is followed by a step 304 consisting in calculating the load rate of the cell 8 with ammonia by integrating estimates of the quantities of gaseous ammonia delivered. In this case, it is possible to evaluate the remaining autonomy in ammonia by means of two simultaneous and complementary strategies: the calculating of the load rate according to the steps 302 and 304, and, periodically, the step of comparing 106 after intrusive measurement 104 in order to determine the crossing or not of critical thresholds of autonomy.

It is as such possible to have at any time an estimate of the remaining autonomy in ammonia with the reserve of having reliable information on the setting up of a new cell or of a filling. As such the method can include a step 306 consisting, after replacing of a storage cell with a storage cell saturated with gaseous ammonia, in reinitialising the value of the load rate of the cell 8 with ammonia.

c. Launching of Steps of Intrusive Controlling and Measurement

The method can include a first preliminary step 202 consisting in evaluating at least one characteristic value.

The can includes a second preliminary step 204 consisting, according to the characteristic value evaluated, in defining a frequency of launching steps of intrusive controlling and of intrusive measurement. As such, as the storage cell 8 is emptied, the frequency of the intrusive measurements 104 requested increases.

Alternatively or as a supplement, the method can include a third preliminary step 206 consisting, according to the characteristic value evaluated, in triggering the steps of intrusive control 102 and of intrusive measurement 104.

The characteristic value can be the load rate 501 of the cell 8 with ammonia calculated in steps 302 and 304.

Figure 6:
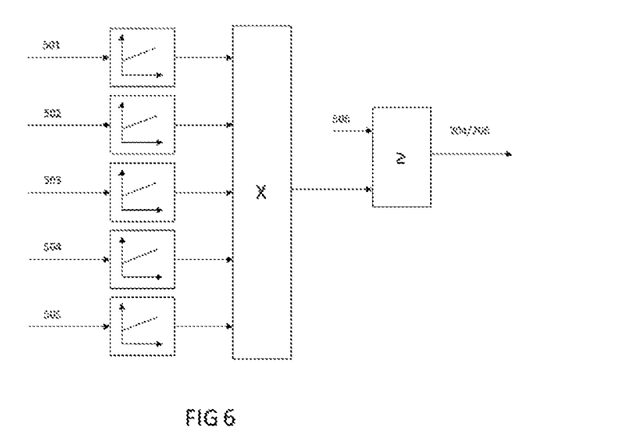
FIG. 6 shows a function of detecting conditions favourable for the triggering of the steps of a method for gauging according to an embodiment of the invention.

Moreover, the characteristic value can include an average pressure 502 in gaseous ammonia of the system over a given period in order to favour the triggering of the intrusive measurement when an abnormally low operating pressure is measured. The characteristic value can include an average heating power 503 supplied to the at least one cell 8 over a given period in order to favour the triggering of the intrusive measurement when the remaining autonomy approaches zero. The characteristic value can include a time after a starting 504 of the consumer unit 3 in order to favour the triggering of the intrusive measurement some time after the starting of the system in order to ensure that the system is in stabilised operating conditions. The characteristic value can further include a characteristic length 505 of the operation of the consumer unit 3 over a given period, such that an average speed of the vehicle over a given number of kilometers in order to favour the triggering of the intrusive measurement during a use at a sustained speed corresponding to flow and pressure conditions close to their maximum values, for the purpose of limiting the energy cost and the cost in ammonia of the intrusive measurement.

As shown in FIG. 6, which shows an operational definition of a function for detecting conditions that are favourable to the carrying out of the steps 204 and 206, the characteristic value can consist in a product of characteristics such as those indicated hereinabove. This product is compared with a threshold 506 in order to determine it if it required to carry out the steps of defining the period 204 or triggering 206 of the intrusive control and of the intrusive measurement.

In the case where the consumer unit 3 is a vehicle, a more complex analysis of the circulation conditions can be implemented, based on more numerous pieces of engine information (engine speed, torque, speed), making it possible for example to define a past and present circulation criterion, and which can possible be substituted for the time information after starting and vehicle average speed.

The characteristic value makes it possible as such to estimate if an intrusive measurement is necessary immediately or must be carried out more or less often. The characteristic value can as such consist in a direct or indirect estimate, for example relative, of the quantity of ammonia remaining in the cell. The intrusive measurement then makes it possible to define the remaining quantity precisely with respect to a threshold.

The characteristic value or values calculated make it possible to detect conditions that are favourable to the launching of the steps of intrusive control 102 and of intrusive measurement 104.

The invention claimed is:

1. Method for gauging an available amount of deliverable gaseous ammonia in a system for storing and delivering gaseous ammonia to a consumer unit, with the system including:
   a storage cell of gaseous ammonia including one of an electrical resistance heater and a heat exchanger, and
   at least one sensor for at least one parameter of the system, the method comprising:
   controlling the system according to an intrusive setting that is independent of an ammonia demand from the consumer unit,
   during said controlling, carrying out an intrusive measurement of at least one parameter of the system by the at least one sensor, and
   comparing the intrusive measurement with a threshold value of the at least one parameter in order to estimate the available amount of deliverable gaseous ammonia in the system,
   wherein the intrusive measurement interrupts the normal operation of the system.

2. The method according to claim 1, wherein the system regulates the flow of gaseous ammonia to the consumer unit, the intrusive setting including a setting for flow rate and for heating.

3. The method according to claim 2, wherein the controlling includes as a first sub-step controlling the system to maintain a zero flow rate and constant pressure setting of the cell.

4. The method according to claim 2, wherein the controlling includes as a second sub-step controlling the system via a maximum flow rate setting.

5. The method according to claim 1, wherein the at least one parameter measured by the intrusive measurement includes a pressure or a temperature of the cell.

6. The method according to claim 1, wherein the at least one parameter measured by the intrusive measurement includes a heating power of the cell.

7. The method according to claim 1 further including:
evaluating at least one predetermined value, and
according to the at least one predetermined value evaluated:
defining a frequency for launching said controlling and intrusive measurement, or
triggering said control and intrusive measurement.

8. The method according to claim 7, further comprising:
estimating a quantity of gaseous ammonia delivered by the cell,
calculating a load rate of the cell with ammonia by estimating quantities of gaseous ammonia delivered, with the load rate being said at least one predetermined value or being one of said at least one predetermined value.

9. The method according to claim 8, further comprising setting the cell ammonia load rate value after replacing the storage cell with a second storage cell saturated with gaseous ammonia.

10. The method according to claim 8, wherein the system includes a flow rate sensor, with the estimating of the quantity of gaseous ammonia delivered being carried out by the measurement of the flow rate of gaseous ammonia by the flow rate sensor.

11. The method according to claim 8, wherein the estimating of the quantity of gaseous ammonia delivered is carried out by a command for delivering gaseous ammonia of the system.

12. The method according to claim 7, wherein the at least one predetermined value includes at least one of:
an average pressure of gaseous ammonia of the system over a given period, or
an average heating power supplied to the storage cell over a given period, or
a time after a starting of the consumer unit, or
a length of the operation of the consumer unit over a given period.

13. The method according to claim 1, further comprising filtering a set of intrusive measurements before said comparing, so as to remove incoherent or out-of-scope values of the measurement.

14. The method according to claim 1, further comprising calibrating the threshold value of the intrusive measurement as a function of characteristics of the storage cell.

15. The method according to claim 1, further comprising changing an operating mode of the consumer unit and/or of the system for storing following a crossing of a filling threshold in order to decrease the ammonia demand.

16. System for storing and delivering gaseous ammonia to a consumer unit using the method defined by claim 1, the system including:
said storage cell of gaseous ammonia including said electrical resistance heater or said heat exchanger,
a flow regulator for regulating the flow rate of gaseous ammonia to the consumer unit,
a controller for said controlling said electrical resistance heater or said heat exchanger and the flow regulator, and
said at least one sensor.

17. The method according to claim 1, further comprising filtering and/or averaging a set of intrusive measurements before said comparing so as to remove the values obtained during an engine stoppage during the intrusive measurement.

18. The method according to claim 1,
further including:
evaluating at least one predetermined value, and
according to the at least one predetermined value evaluated:
defining a frequency for launching said controlling and intrusive measurement, or
triggering said control and intrusive measurement,
further comprising:
estimating a quantity of gaseous ammonia delivered by the cell,
calculating a load rate of the cell with ammonia by estimating quantities of gaseous ammonia delivered, with the load rate being said at least one predetermined value or being one of said at least one predetermined value,
further comprising setting the cell ammonia load rate value after replacing the storage cell with a second storage cell saturated with gaseous ammonia,
wherein
the system includes a flow rate sensor, with the estimating of the quantity of gaseous ammonia delivered being carried out by the measurement of the flow rate of gaseous ammonia by the flow rate sensor, or
the estimating of the quantity of gaseous ammonia delivered is carried out by a command for delivering gaseous ammonia of the system.

19. The method according to claim 5, wherein the pressure values measured during the intrusive measurement are filtered before being used to define a sliding average for pressure.

20. The method according to claim 6, wherein the heating power values measured during the intrusive measurement are filtered before being used to define a sliding average for heating power.

21. The method according to claim 13, wherein heating power values measured during the intrusive measurement are filtered before being used to define a sliding average for heating power.

* * * * *